Sept. 15, 1959  G. C. HALL  2,904,703
COMBINATION SERVICE ENTRANCE PROTECTION AND DEMAND CONTROL
Filed June 28, 1957  2 Sheets-Sheet 1

Sept. 15, 1959  G. C. HALL  2,904,703
COMBINATION SERVICE ENTRANCE PROTECTION AND DEMAND CONTROL
Filed June 28, 1957  2 Sheets-Sheet 2

Inventor
Guy C Hall
by Stevens, Davis, Miller & Mosher
his Attorneys

United States Patent Office 2,904,703
Patented Sept. 15, 1959

2,904,703

COMBINATION SERVICE ENTRANCE PROTECTION AND DEMAND CONTROL

Guy C. Hall, St. Petersburg, Fla.

Application June 28, 1957, Serial No. 668,740

4 Claims. (Cl. 307—34)

This invention relates to the regulation of electric power loads.

Because electric utilities have found it necessary to formulate their rate structure to take into account the maximum demand or peak load, that the particular customer places on the system, the so-called demand control type of device has been developed by which the high peaks in the customer's demand curve can be reduced. Certain loads are designated as less preferred loads and apparatus is provided either to disconnect these less preferred loads or connect them to a reduced voltage during the times of peak use of the more preferred loads of the installation. Assuming the customer to be a normal domestic user, the more preferred loads would commonly be those employed for lighting and cooking, while the less preferred loads would be the water and/or space heating loads.

The dumping of less preferred loads at peak periods improves the system load factor of the electric utility and thus allows the electric utility to offer rates for water and space heating competitive with other forms of power.

The present invention is concerned with improvements in installations of this general character.

An example of an installation according to the present invention is illustrated in the accompanying drawings.

The two main units of the installation are a service entrance unit 10 and one or more identical relay units 11. There will be any required number of such relay units 11, each supplying a pair of distribution panels 12, each of which further supplies a plurality, say three, heaters H etc. The service entrance unit 10, as its name implies, is mounted at some convenient place on the exterior of the premises so as to be readily available to officials of the supplying utility for purposes of inspection, meter reading and calibration of the mechanisms housed in such unit. This service entrance unit will normally be installed by and remain the property of the utility, whereas the relay units 11 and distribution panels 9 and 12 which are mounted inside the premises will be installed by the building contractor and will become the property of the owner of the premises. Conduits carry the cables extending between these parts.

Figure 1:
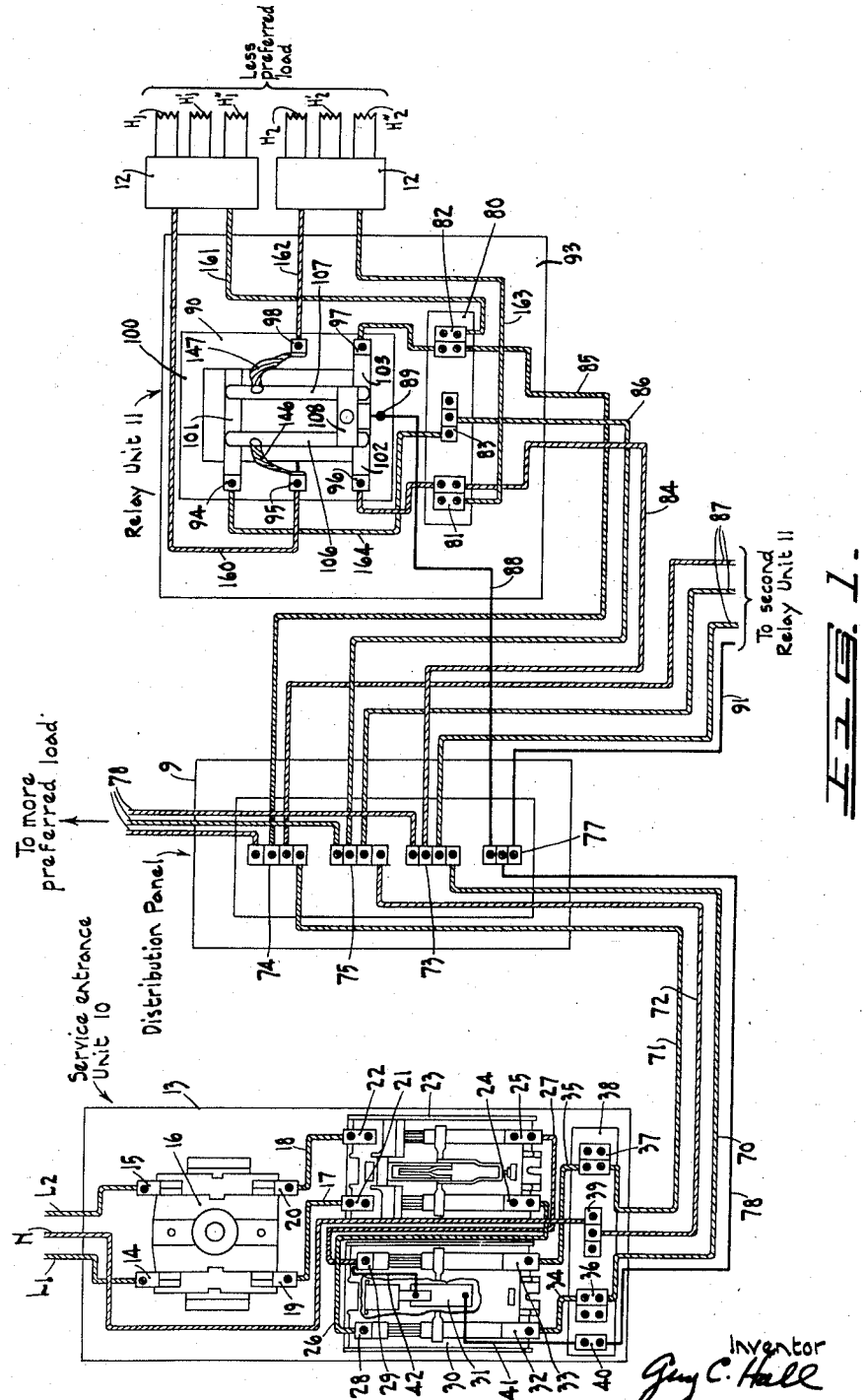
Figure 1 is a view of the two main units of the installation and also includes a distribution panel and a circuit diagram illustrating the manner of connection of these parts together.

The installation is designed to operate with a single-phase three-wire Edison type distribution system, and the power supply lines L1, L2 and N enter the service entrance unit 10 as shown in Figure 1 through a suitable sealed bushing connected with the upper wall of the metal box 13 which constitutes the housing for the service entrance unit 10. The leads L1 and L2 will be connected to the input terminals 14 and 15 of a conventional meter socket assembly 16. Leads 17 and 18 extend from the output terminals 19 and 20 of the meter socket assembly 16 to the input terminals 21 and 22 of a totalizing circuit breaker 23. This circuit breaker 23 will not be described herein in detail. It will be preferably of the type described in United States patent application Serial No. 494,343, filed March 15, 1955. The output terminals 24 and 25 of the circuit breaker 23 are connected by leads 26 and 27 to the input terminals 28 and 29 of a demand control unit 30 which includes a microswitch 31 arranged to be closed when a certain predetermined totalized current flows through the two active leads. Details of construction and operation of this demand control device are provided in United States patent application Serial No. 502,991, filed April 21, 1955. The demand control unit 30 will preferably be of the type illustrated in Figure 4 of such latter other application.

Figure 2:
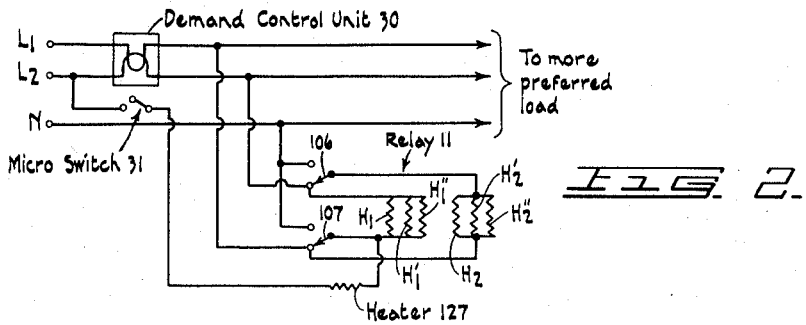
Figures 2 to 4 are simplified circuit diagrams illustrating various manners in which the system may be connected.
Figure 3:
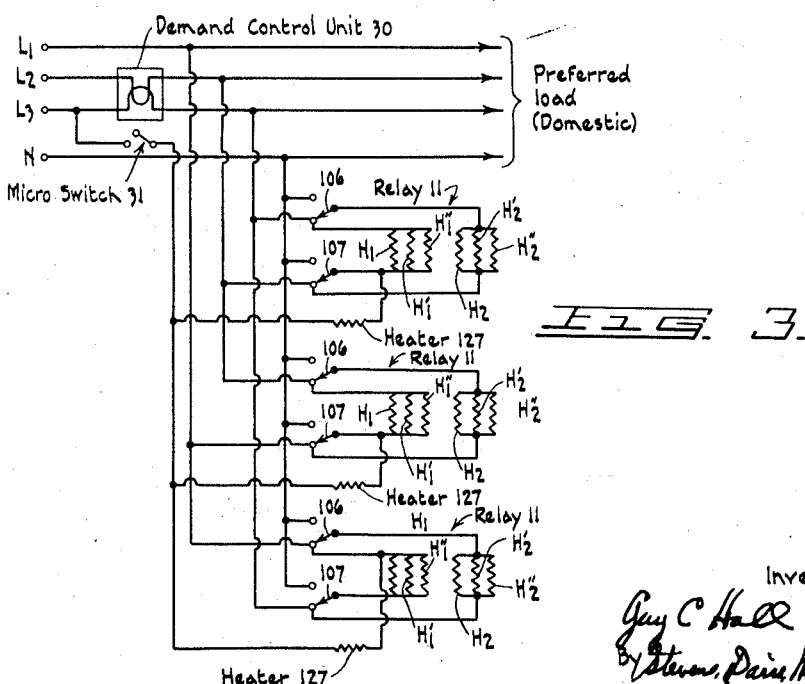

Alternatively, the functions of the circuit breaker and demand control unit can be carried out by a single device, such as that shown in Figures 1 to 3 of such latter other application.

The output terminals 32 and 33 of the demand control unit 30 are connected by leads 34 and 35 to terminals 36 and 37 of a terminal block 38. The neutral lead N passes directly down through the service entrance unit to be connected to terminal 39 of the terminal block 38. The terminal block 38 also includes a connection 40 that receives a lead 41 extending from the microswitch 31. The other side of the microswitch 31 is connected by lead 42 to terminal 29. An operating handle (not shown) is provided for controlling the circuit breaker 23 from the exterior of the box 13 when the lid is in position.

Cables 70, 71 and 72 extend respectively from terminals 36, 37 and 39 of the terminal block 38 to convey power from the lines L1, L2 and N, when the circuit breaker 23 is closed. These cables extend to terminals 73, 74 and 75 respectively of the main domestic distribution panel 9 mounted inside the premises. The panel 9 also includes a terminal 77 which is connected to terminal 40 on the terminal block 38 by control wire 78. From the distribution panel 9 there are taken three cables designated generally as 78. These extend to the normal domestic load (lighting, cooking and general appliances) which is the more preferred load. As will appear later, this load, which is not further illustrated in the drawings, is always connected to the source of power, at least when the main circuit breaker 23 is closed.

The less preferred load, which has been assumed to consist of a number of space heaters $H_1$, $H_2$ etc., is supplied through a pair of relay units 11. Each relay unit 11 includes a terminal block 80 having sets of terminals 81, 82 and 83. The terminal 81 is connected by cable 84 to terminal 73 of the distribution panel 9; terminal 82 is similarly connected by cable 85 to terminal 74 of the distribution panel; and the neutral terminal 83 is connected by cable 86 to the neutral terminal 75 of the panel 9. Similar cables, designated generally at 87, connect corresponding terminals of the distribution panel 9 to the second relay unit which is identical with the illustrated unit. In addition, a control wire 88 extends from the terminal 77 of the panel 9 to a terminal 89 on the body of the relay 90 which forms the principal element of the relay unit 11. A similar control wire 91 is associated with the cables 87 extending to the second relay unit. The relay 90 is mounted in a box 91 provided with a conventional lid.

The relay 90 consists of a base 93 on which there are mounted terminals 94, 95 and 96 along one edge and 97 and 98 along the opposite edge. A raised platform 100 of insulating material is supported above the base 93 by means of a rigid contact strip 101 connected to the terminal 94, two rigid contact strips 102 and 103 connected to terminals 96 and 97 respectively, and by an inverted U-shaped bracket the arms of which extend upwardly from a central connection to the base 93. Mounted on the upper surface of the platform 100 are a pair of upstanding lugs serving as pivotal mountings for a pair of contact arms 106 and 107. The arms 106 and 107 are interconnected at one end by a transverse insulating bar 108 the centre of which cooperates with an upwardly projecting actuating lever (not shown). At its lower end the actuating rod is secured to the centre of a U-shaped plate which forms part of a snap action mechanism.

Also centrally mounted on the base 93 and generally beneath this snap action mechanism is a thermally operated device comprising a heater 127 (see Figure 2) arranged between a pair of bimetallic elements. Deflection of the bimetallic assembly, which can be brought about by energization of the heater 127, will cause snapping over of the snap action mechanism into the second position moving the actuating lever upwardly to tilt the contact arms 106 and 107 into their second position.

In their rest position the contact arms 106 and 107, which carry contacts on their lower ends engage these contacts with corresponding fixed contacts mounted respectively on contact bars 102 and 103, the contact pressure being provided through a spring. At their other ends, the arms 106 and 107 each carry a contact which is mounted for engagement with a complementary contact mounted on the terminal strip 101. The electrical connections of the contact arms 106 and 107 are completed by a pair of flexible straps 146 and 147 which connect the respective arms to terminals 95 and 98.

Consideration will now be given to the mode of operation of the relay unit 11. In the normal rest position, the relay unit 90 serves to connect the incoming power supply of line L1 from terminal 81, through terminal 96 and contact arm 106, to terminal 95, and hence via lead 160 to the upper one of the pair of distribution panels 12. The other side of this panel 12 is directly energized from terminal 82 through lead 161, terminal 82 being connected to incoming line L2. This upper panel 12 in turn feeds heaters $H_1$, $H_1'$ and $H_1''$, disposed about the premises at appropriate points. Similarly the contact arm 107 serves to connect terminal 82 through terminals 97 and 98 to lead 162, passing power to the upper side of the lower distribution panel 12, while the lower side of such panel is connected through lead 163 directly to terminal 81. Heaters $H_2$, $H_2'$, and $H_2''$ are connected to this lower panel 12. Thus the heaters H etc. are, in this position of the relay, connected directly across lines L1 and L2.

The neutral connection into the relay unit comes in at terminal 83 and is directly connected to terminal 94 through lead 164. Thus, when the two contact arms 106 and 107 are switched over into their actuated position, the leads 160 and 162 are immediately disconnected from their supplies and are connected to neutral through terminal 94 and contact bar 101. In this position, the heaters of the lower panel 12 is connected between line L1 and neutral and the heaters of the upper panel 12 is connected between line L2 and neutral. Thus both sets of heaters are immediately placed on half voltage and will each draw one quarter of their normal power from the system.

As already explained, operation of the relay unit 90 is effected by energization of the heater 127 in the thermally operated device. This heater is permanently connected between terminal 89 and terminal 95.

The overall operation of the system will now be described. The circuit breaker 23 will be calibrated to trip at a predetermined overload condition. This circuit breaker will thus provide protection for the system as a whole (including both the more and less preferred loads) against overloading of a general nature and in particular against short circuits. The relay contacts should be capable of withstanding the short-circuit rating of the circuit breaker for a time equal to the interrupting time of the breaker. The demand control unit 30 will be calibrated to operate at a lower value than that of the circuit breaker 23. Both these devices will be of the totalizing type in which operation is a function of the total value of the two currents flowing in the two active leads L1 and L2. Details of this manner of functioning are described in detail in the two co-pending applications referred to above.

The demand control unit 30 will be calibrated to be actuated when the total load, both the more and less preferred loads combined, reaches a maximum predetermined value decided upon by the utility and customer in determining the customer's rate structure. This value is, of course, smaller than the value at which the circuit breaker 23 will be set to trip.

It will be apparent that the supply to both the more preferred and the less preferred loads passes through both the circuit breaker 23 and the demand control unit 30, since these are both housed in the service entrance unit. Actuation of the demand control unit 30 will not interrupt normal supply as would actuation of the circuit breaker 23, but will effect closing of the microswitch 31 with consequent connection of the control wire 78 to terminal 29 and hence to line L2. This control energization will pass through the terminal 77 on the distribution panel 9 and along control wires 88 and 91 to each of the relay units 11. In the relay unit 11 illustrated, this connection of the control wire 88 to the lead L2 will cause energization of the heater 127 through terminals 89 and 95, since the terminal 95 will at this time be connected through the flexible strap 146 and the contact arm 106 to terminal 96 which is energized from the line L1. Thus the full line voltage is applied across the heater 127 which quickly heats up and snaps over the relay unit in the manner previously described. This operation is timed to take about 40 seconds, the thermal nature of mechanism thus ensuring that the relay unit will not be operated by any transients caused by switching surges, i.e. range switching or tungsten lamp switching.

The relay unit then switches over the heaters H etc. from full line voltage to line to neutral voltage, in the manner previously described. At the same time, the terminal 95 is changed over from its connection to line L1 to a connection to neutral, so that half voltage is also applied across the heater 127. The demand control unit 30 may be returned to its initial position with the microswitch 31 open as a result of the decreased load consequent upon connection of the less preferred load to the reduced voltage. However, if the demand peak prevails, the heater 127 and the bimetallic elements associated with it will continue to receive half voltage energization and will hold the relay in the switch-over low voltage position. Thus the relay will remain in this position until the demand peak passes and the micro-switch is allowed to reopen. When this does happen the thermal nature of the device again introduces a time delay. Preferably the device is calibrated for the cooling of the heater 127 and return of the relay to the full voltage position to take a period of about 5 minutes after the heater has been completely de-energized. This type of operation avoids excessively rapid hunting of the apparatus, since, once the relay unit switches the less preferred load back onto full voltage, the same operation as already described will be repeated should the total load exceed the value set on the unit 30.

It will be appreciated that a large number of relay units 11 may be controlled from one service entrance unit.

The application of the invention to a three-phase four-wire distribution system is illustrated diagrammatically in Figure 3. The demand control unit 30 is placed in lines L2 and L3, and three relays 11 are employed. Each of these relays 11 is shown in the drawing as connecting its corresponding heaters H etc. between a pair of lines of the three-phase supply. When each of the relays 11 is moved to its other position, its heaters H etc. will be connected between one line and neutral. If the three-phase system is a Y-connected system, the heaters H etc. will then be dumped onto one-third power. If the system is delta-connected with the neutral line taken from the centre point of one of the transformer windings, those heaters H etc. that are dumped to a connection between neutral and the high phase will operate thereafter on three-quarters power, whereas those connected between neutral and one of the other lines will be dumped to a quarter power.

Figure 4:
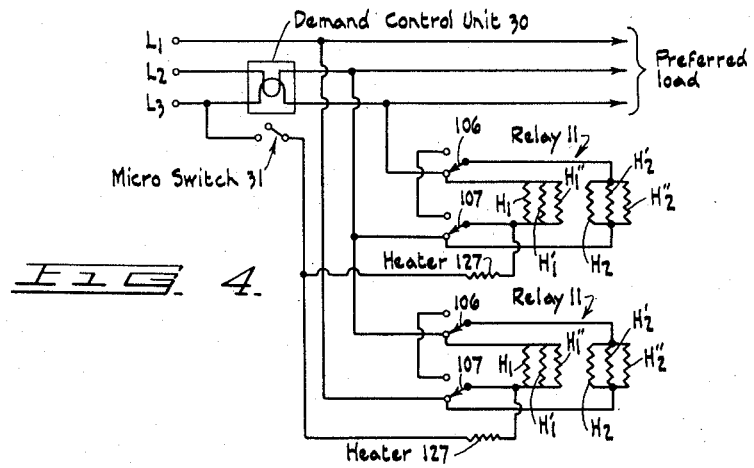

Figure 4 shows a smilar simplified circuit diagram illustrating the manner in which the invention may be applied to a three-phase three-wire distribution system. In this case when the relays 11 are switched to the low voltage position, the heaters H etc. controlled thereby are switched from a parallel to a series connection so that the power is reduced to a quarter.

I claim:

1. A system for the distribution and control of electric power of a type providing two different voltage levels to at least two loads situated in a building, one such load being designated the more preferred load and the other such load being designated the less preferred load, said system comprising a service entrance unit mounted at an exteriorly accessible location on said building, input cables to said service entrance unit, output cables from said service entrance unit, a distribution panel, said output cables extending from said service entrance unit to said distribution panel, cables extending from said distribution panel to said more preferred load, a relay unit mounted separately from said service entrance unit, cables extending from said distribution panel and to said relay unit, and cables extending from said relay unit to said less preferred load, said service entrance unit comprising a meter, an overload protection device and control means sensitive to the total current throughput in said service entrance unit, and said relay unit comprising a double throw relay arranged in its rest position to connect said less preferred load to the higher voltage and in its actuated position to connect said less preferred load to the lower voltage, said control means being connected to said relay for actuation thereof on attainment of a predetermined level by said throughput.

2. A system for the distribution and control of electric power of a type providing two different voltage levels to at least two loads situated in a building, one such load being designated the more preferred load and the other such load being designated the less preferred load, said system comprising a service entrance unit mounted at an exteriorly accessible location on said building, input cables to said service entrance unit, a relay unit mounted separately from said service entrance unit, output cables extending from said service entrance unit to said more preferred load, and to said relay unit, and cables extending from said relay unit to said less preferred load, said service entrance unit comprising a meter, an overload protection device and control means sensitive to the total current throughput in said service entrance unit, and said relay unit comprising a double throw relay arranged in its rest position to connect said less preferred load to the higher voltage and in its actuated position to connect said less preferred load to the lower voltage, said control means being connected to said relay for actuation thereof on attainment of a predetermined level by said throughput.

3. A system for the distribution and control of electric power of a type providing two different voltage levels to at least two loads situated in a building, one such load being designated the more preferred load and the other such load being designated the less preferred load, said system comprising a service entrance unit mounted on said building, input cables to said service entrance unit, a relay unit mounted separately from said service entrance unit, output cables extending from said service entrance unit to said more preferred load and to said relay unit, and cables extending from said relay unit to said less preferred load, said service entrance unit comprising a meter, an overload protection device and control means sensitive to the total current throughput in said service entrance unit, and said relay unit comprising a double throw relay arranged in its rest position to connect said less preferred load to the higher voltage and in its actuated position to connect said less preferred load to the lower voltage, said control means being connected to said relay for actuation thereof on attainment of a predetermined level by said throuhgput.

4. A system for the distribution and control of electric power of a type providing two different voltage levels to at least two loads situated in a building, one such load being designated the more preferred load and the other such load being designated the less preferred load, said system comprising a service entrance unit, input cables to said service entrance unit, a relay unit mounted separately from said service entrance unit, output cables extending from said service entrance unit to said more preferred load and to said relay unit, and cables extending from said relay unit to said less preferred load, said service entrance unit comprising an overload protection device and control means sensitive to the total current throughput in said service entrance unit, and said relay unit comprising a double throw relay arranged in its rest position to connect said less preferred load to the higher voltage and in its actuated position to connect said less preferred load to the lower voltage, said control means being connected to said relay for actuation thereof on attainment of a predetermined level by said throughput.

References Cited in the file of this patent

UNITED STATES PATENTS

| | | |
|---|---|---|
| 2,521,171 | Kircher | Sept 5, 1950 |
| 2,769,924 | Beery | Nov. 6, 1956 |
| 2,789,197 | Boehm | Apr. 16, 1957 |